E. E. SIMMS AND G. W. JOHNSON.
AUTOMATIC CARRIAGE FOR STACKERS.
APPLICATION FILED FEB. 16, 1918.
1,319,629.
Patented Oct. 21, 1919.
3 SHEETS—SHEET 1.
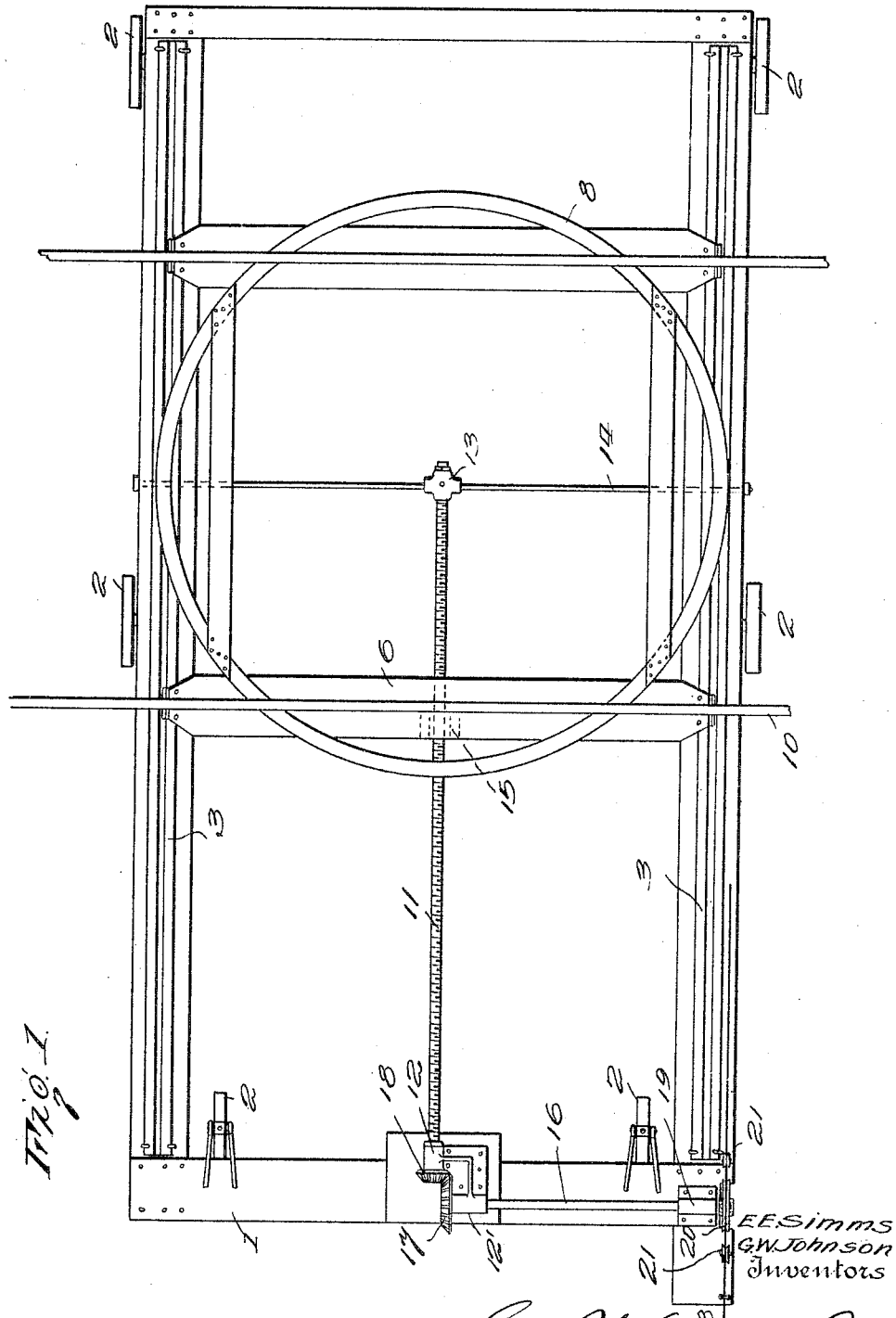

E. E. SIMMS AND G. W. JOHNSON.
AUTOMATIC CARRIAGE FOR STACKERS.
APPLICATION FILED FEB. 16, 1918.
1,319,629.
Patented Oct. 21, 1919.
3 SHEETS—SHEET 2.
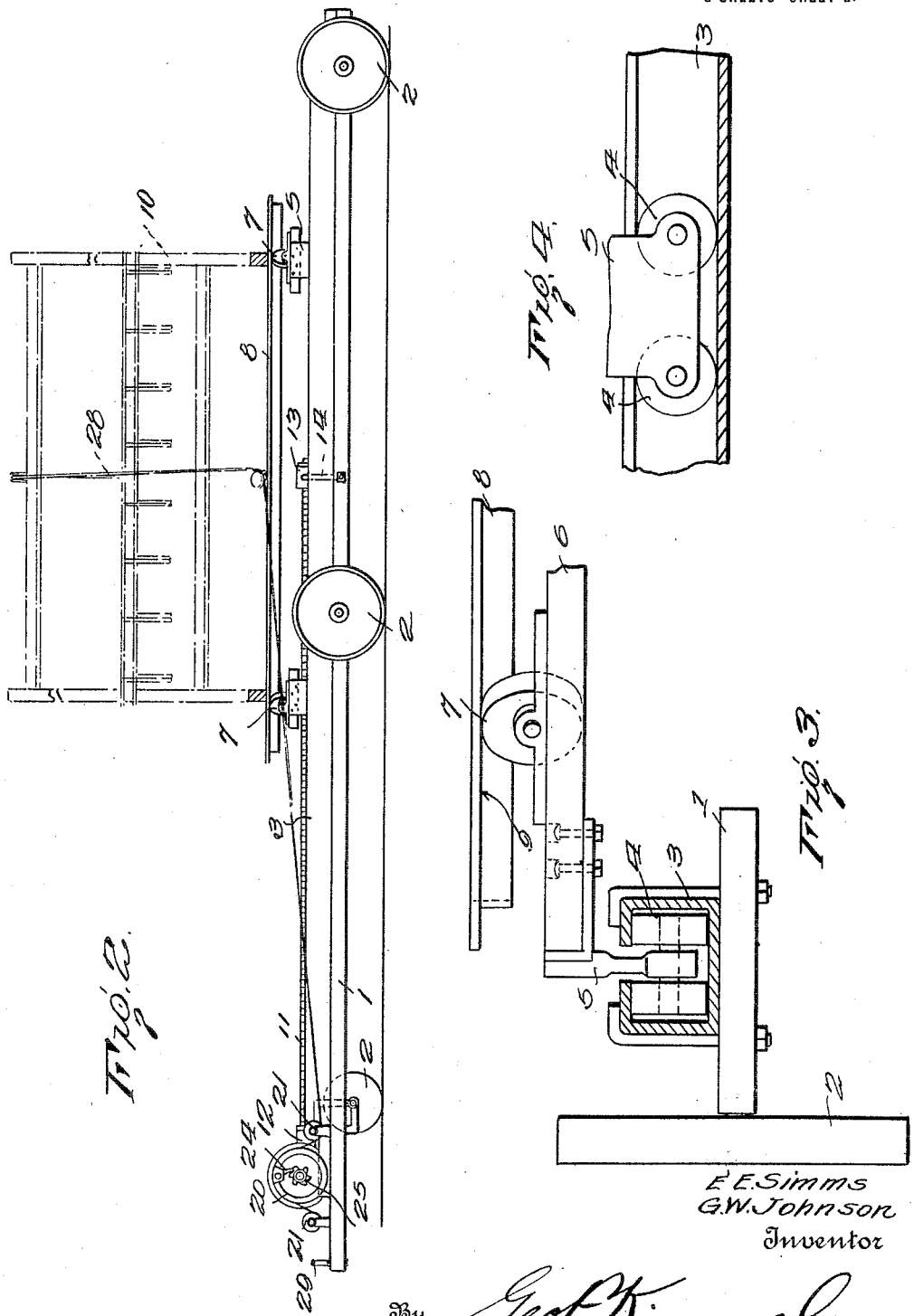
E. E. Simms
G. W. Johnson
Inventor
By Geo. P. Kimmel
Attorney E. E. SIMMS AND G. W. JOHNSON.
AUTOMATIC CARRIAGE FOR STACKERS.
APPLICATION FILED FEB. 16, 1918.
1,319,629.
Patented Oct. 21, 1919.
3 SHEETS—SHEET 3.
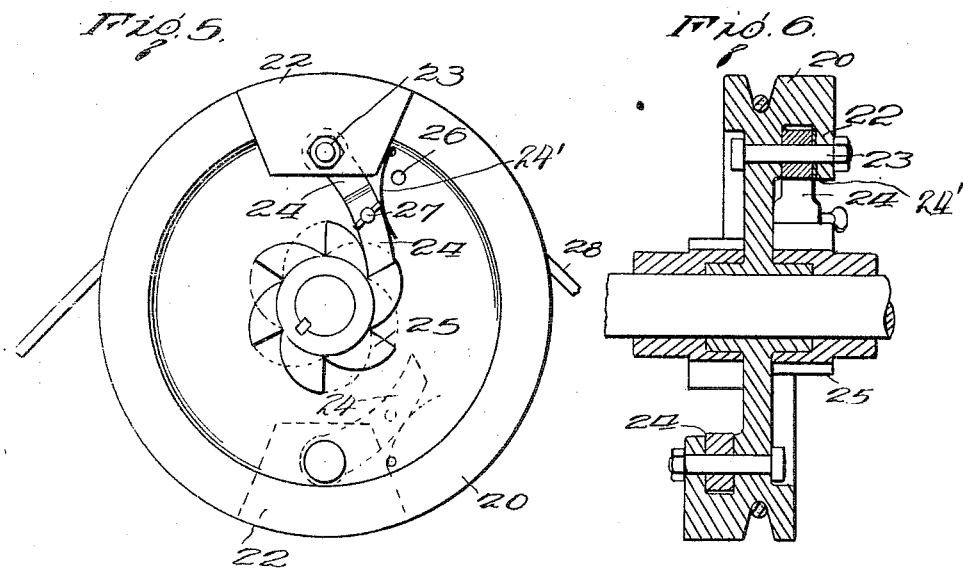
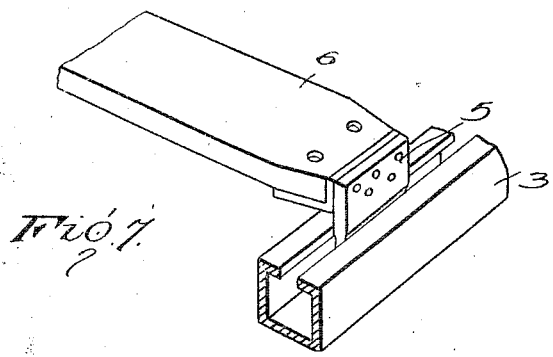
E. E. Simms
G. W. Johnson
Inventor
By Geo. P. Kimmel
Attorney

UNITED STATES PATENT OFFICE.

EARL E. SIMMS AND GUST W. JOHNSON, OF LONGMONT, COLORADO.

AUTOMATIC CARRIAGE FOR STACKERS.

1,319,629.   Specification of Letters Patent.   Patented Oct. 21, 1919.

Application filed February 16, 1918. Serial No. 217,647.

*To all whom it may concern:*

Be it known that we, EARL E. SIMMS and GUST W. JOHNSON, citizens of the United States, residing at Longmont, in the county of Boulder and State of Colorado, have invented certain new and useful Improvements in Automatic Carriages for Stackers, of which the following is a specification.

The present invention has reference to certain improvements in hay stackers and it is the principal object of the invention to provide a novel form of carriage for supporting hay stackers and like forms of elevating devices, for automatically shifting or advancing the same in order that the hay or straw handled thereby will be evenly spread during the stacking operation, thereby lengthening the stack so formed and dispensing with the labor and resultant expense of men, who have, heretofore, been arranged upon a stack being formed for evenly spreading the hay or straw subsequently to the delivery of the same thereonto.

The invention consists, furthermore, in the novel arrangements and combinations of the parts of the device, as well as in the details of construction of the same, all of which will be more fully described in the following specification, and then finally embodied in the clauses of the claims, which are appended to this specification and which form an essential part of the same.

The invention is clearly illustrated in the accompanying drawings, in which:

Figure 1 is a top plan of the improved loader,

Fig. 2 is a side elevation of the same,

Fig. 3 is a fragmental transverse section therethrough,

Fig. 4 is a fragmental detail in section showing the mounting of the carriage,

Fig. 5 is a side elevation of the novel sheave wheel,

Fig. 6 is a transverse section through the same, and

Fig. 7 is a fragmentary detail in perspective of the carriage mounting.

Having more particular reference to the drawings, in connection with which like reference characters designate corresponding parts throughout the several views of the drawings, 1 represents the base of our improved device, the same, obviously, comprising a substantially rectangularly shaped frame rendered portable by the provision of wheels generally indicated by the numeral 2 mounted on suitable axles or like bearings secured to said base; it being noted in this connection, that the forward wheels of the base are dirigible to permit the guiding of the same. Tracks 3 are secured to the upper faces of the parallel longitudinal members of the base 1 and receive therein rollers 4 secured by brackets 5 to a carriage 6 at different points, preferably adjacent the various corners of the same. On the transverse elements of the carriage 6, we mount, in suitable bearings, a plurality of roller bearings designated by the numeral 7, said bearings being so disposed as to permit the mounting of a circular turn-table 8 thereon, which turn table, as will be understood, has a suitable way or track 9 formed upon the under surface thereof for receiving the upper portions of the bearings 7 therein in order that lateral displacement of the turn-table will be prevented.

A stacker indicated in its entirety by the numeral 10 is fixedly mounted on the turn-table 8 and as will be understood, serves as means for elevating the hay, straw, or other matter being handled thereby to a certain point, whereupon, it is discharged onto the stack being formed. In this connection, we desire to have it clearly understood that various forms of stackers may be arranged on the turn-table 8, such as conditions may dictate; this structure, manifestly, forming no part of the invention.

Extending longitudinally of the intermediate portion of the base sides and carriage is a screw threaded shaft 11, one end of said shaft being rotatably supported in bearings 12 fixedly mounted upon the transverse piece adjacent one end of said base, while the remaining end of said rod is swivelly connected as at 13 with a transversely disposed tie-rod 14 having its opposite ends engaged with the side portions of the base 1. To effect connection between the carriage 6 and the screw threaded shaft, there is mounted upon the under side of one of the end or transverse pieces of said carriage, a boxing 15, which as will be understood, is internally screw threaded and receives the shaft 11 therethrough.

Mounted in bearings 12', is one end of a power transmitting shaft 16 carrying a bevel gear 17, which gear as will be noted, meshes with similar, but smaller gear 18 keyed to the adjacent end of the screw threaded shaft 11. The remaining end of the shaft 16 is mounted in bearings 19 secured to one side of the base adjacent the end thereof and carries a sheave wheel 20 thereon, which sheave wheel has idlers 21 rotatably mounted in bearings on each end thereof.

Arranged on or formed integral with the sheave wheel 20 are oppositely disposed bracket arms 22, which bracket arms receive pivot pins 23 therethrough carrying pawls 24. Ratchet elements 25 are arranged upon the opposite sides of the sheave wheel adjacent the central or hub portion of the same and are adapted to be engaged, at times, by the pivotal pawls 24. To effect a positive connection between the several ratchets and their respective pawls, springs 24' are engaged with the pawls and serve to normally move the same into engagement with the teeth of the ratchet elements 25. Openings 26 may be and preferably are formed in the web portion of the sheave wheel while other openings 27 are formed in the several pawls and are adapted to receive set screws therethrough, these set screws, obviously, engaging in the openings 26 whereby to permit securing of the same in inoperative positions.

As will be understood, the stacker 10 is provided with a hoisting cable 28, which cable has one end connected to the load handling means while the remaining end is connected to a suitable source of power, whereby the load handling means will be elevated and lowered as desired. The cable 28 upon leaving the stacker is passed through suitable guide elements 29 secured to the base 1 and is passed under and over the idlers 21 and the sheave wheel 20. Thus, when the cable is moved to its connection with the source of power, rotary motion will be imparted to the sheave wheel 20 and hence to the power transmitting shaft 16.

The operation of the device may be reviewed as follows: To cause the carriage 6 to be automatically moved forwardly of the base 1 subsequent to the discharge of a load of hay, one of the pawls 24 is moved into engagement with its respective ratchet by disengaging the screw 27 therefrom. Hence, when the cable 28 is pulled to cause elevation of the load handling means, the sheave wheel 20 will be rotated in a direction such as will permit the pawl 24 to ride idly over the various teeth of the ratchet 25. However, after the load has been released from the load handling means and the same is being returned to its lower position on the stacker, the cable 28 is of course moved in a reverse direction and in consequence, causes reverse rotation of the sheave wheel 20, whereupon said pawl 24 is engaged with one of the teeth of the ratchet 25, thereby effecting connection between the sheave wheel and the power transmitting shaft 16 and causing the beveled gearing 17 and 18 to be rotated, thereby rotating the screw threaded shaft 11 sufficiently to cause the carriage 6 to be automatically shifted to a position laterally or to one side of the load last discharged from the stacker. In this way, when a second load is discharged from the stacker, it will be arranged adjacent the load first discharged and by consequence, will cause the hay or other matter to be evenly spread or distributed, thereby permitting the lengthening of the stack and dispensing with considerable labor and expense. After the carriage 6 has been moved to the extent of its travel of the base 1 it then becomes necessary to return the same to its normal or starting position. To effect such return of the carriage, the remaining pawl 24 is engaged with its respective ratchet while the first mentioned pawl is disengaged with its ratchet. The teeth of the second ratchet wheel extend in an opposite direction to the first ratchet wheel and therefore the transmission of power to the shaft 11 is reversed and thus returns the carriage and the stacker in a step-by-step manner to its normal or starting position. It is of course understood that during the return of the carriage the movement will be imparted during the raising of the load handling means instead of during the lowering of the same. Obviously, in this manner, the carriage and stacker may be moved back and forth upon the base 1 for any number of times as desired, thereby allowing a stack to be effectually built. To render the carriage immovable, it is only necessary to disengage each of the pawls 24 from their respective ratchets, whereupon the sheave wheel 20 will rotate idly upon movement of the cable 28.

When desiring to move our improved device from field to field, the portable base 1 is hitched to suitable draft means and the turn-table 8 is rotated to cause the stacker 10 to be arranged endwise thereon, thus permitting the same to be drawn freely through gate ways or other similar passages. In this connection, it is to be understood that various forms of means may be employed for locking the turn-table in an adjusted position to permit the operation of the same.

Manifestly, the construction shown is capable of considerable modification, and such modification as is within the scope of our claims, we consider within the spirit of our invention.

We claim:

1. In combination with elevating means, a base, a carriage movable over said base carrying the elevating means, and means connected to the carriage and operable by the hoisting cable of the elevating means for causing movement of this carriage.

2. In combination with elevating means, a base, a carriage movable over said base carrying the elevating means, and means connected to the carriage and operable by the hoisting cable of the elevating means for automatically causing movement of said carriage in a step-by-step fashion.

3. In combination with elevating means, a base, a carriage movable over said base carrying the elevating means, and means connected to the carriage and operable by the hoisting cable of the elevating means for automatically causing movement of said carriage back and forth over the base in a step-by-step fashion.

4. In combination with elevating means, a portable base, a carriage movable on said base, a turn-table mounted on the carriage carrying elevating means, and means connected to the carriage and operable by the hoisting cable of the elevating means for automatically causing movement of the carriage.

5. In combination with elevating means, a portable base, a carriage movable over said base carrying the elevating means, means connected to the carriage and operable by the hoisting cable of the elevating means for causing movement of said carriage over the base in a step-by-step fashion, and other means engageable with the carriage moving means for reversing the direction of travel of said carriage.

6. In combination with elevating means, a base, a carriage movable over said base, a turn-table mounted on the carriage carrying the elevating means, means connected to the carriage and supported on the base operable by the hoisting cable of the elevating means for automatically causing movement of said carriage over the base in a step-by-step fashion, and means engageable with the carriage moving means for reversing the direction of travel of said carriage.

In testimony whereof, we affix our signatures hereto.

EARL E. SIMMS.
GUST W. JOHNSON.

Copies of this patent may be obtained for five cents each, by addressing the "Commissioner of Patents, Washington, D. C."